(12) United States Patent
Burkhardt et al.

(10) Patent No.: US 11,231,131 B2
(45) Date of Patent: Jan. 25, 2022

(54) SYSTEM FOR MONITORING OVERHEAD LINES

(71) Applicant: DIPL.-ING. H. HORSTMANN GmbH, Heiligenhaus (DE)

(72) Inventors: Erwin Burkhardt, Hamm (DE); Meinolf Gerick, Mulheim (DE)

(73) Assignee: DIPL.-ING. H. HORSTMANN GmbH, Heiligenhaus (DE)

( * ) Notice: Subject to any disclaimer, the term of this patent is extended or adjusted under 35 U.S.C. 154(b) by 257 days.

(21) Appl. No.: 16/352,385

(22) Filed: Mar. 13, 2019

(65) Prior Publication Data
US 2019/0285202 A1 Sep. 19, 2019

(30) Foreign Application Priority Data
Mar. 14, 2018 (DE) .................. 10 2018 105 870.5

(51) Int. Cl.
*F16L 5/10* (2006.01)
*F16J 15/10* (2006.01)

(52) U.S. Cl.
CPC ............... *F16L 5/10* (2013.01); *F16J 15/102* (2013.01); *F16J 15/104* (2013.01)

(58) Field of Classification Search
CPC ............ F16L 5/10; F16J 15/102; F16J 15/104
See application file for complete search history.

(56) References Cited

U.S. PATENT DOCUMENTS

| | | | | |
|---|---|---|---|---|
| 2,529,486 A | * | 11/1950 | Clarkson | F42B 22/10 441/25 |
| 5,755,463 A | * | 5/1998 | Davidson | F16L 5/10 285/205 |
| 5,973,271 A | * | 10/1999 | Fujita | F16L 5/10 174/152 G |
| 2006/0181078 A1 | * | 8/2006 | Lauridsen | F16L 41/088 285/125.1 |
| 2009/0218132 A1 | * | 9/2009 | Delakowitz | F16L 5/10 174/669 |
| 2011/0018210 A1 | * | 1/2011 | Beele | F16L 5/10 277/606 |
| 2012/0104007 A1 | * | 5/2012 | Beele | F16L 5/14 220/676 |
| 2015/0292649 A1 | * | 10/2015 | Beele | F16L 5/14 277/606 |
| 2016/0177557 A1 | * | 6/2016 | Wedi | E03F 5/041 277/615 |
| 2017/0361790 A1 | * | 12/2017 | Kaefer | H01R 9/0524 |
| 2018/0126929 A1 | * | 5/2018 | Miller | F16L 5/10 |
| 2018/0128400 A1 | * | 5/2018 | Twelves | H02G 3/22 |

FOREIGN PATENT DOCUMENTS

| | | | | |
|---|---|---|---|---|
| AT | 237709 B | | 1/1965 | |
| DE | 3801920 A1 | | 8/1989 | |
| DE | 19835916 A1 | | 2/2000 | |
| DE | 69811513 T2 | | 11/2003 | |
| JP | 10311053 A | * | 11/1998 | ............ F16L 41/088 |
| JP | 11170853 A | * | 6/1999 | ................ F16L 5/10 |
| JP | 2001193841 A | * | 7/2001 | ................ F16L 5/10 |

* cited by examiner

*Primary Examiner* — Eugene G Byrd
(74) *Attorney, Agent, or Firm* — Thomas | Horstemeyer, LLP

(57) ABSTRACT

A seal is described for sealing a fairlead of an object through a (housing) wall, wherein the seal surrounds the object with form fit at least in the area of the housing fairlead. The seal has an insulating rib encircling its circumference and a hydrophobic surface.

16 Claims, 4 Drawing Sheets

SYSTEM FOR MONITORING OVERHEAD LINES

CROSS-REFERENCE TO RELATED APPLICATIONS

Figure 1A:
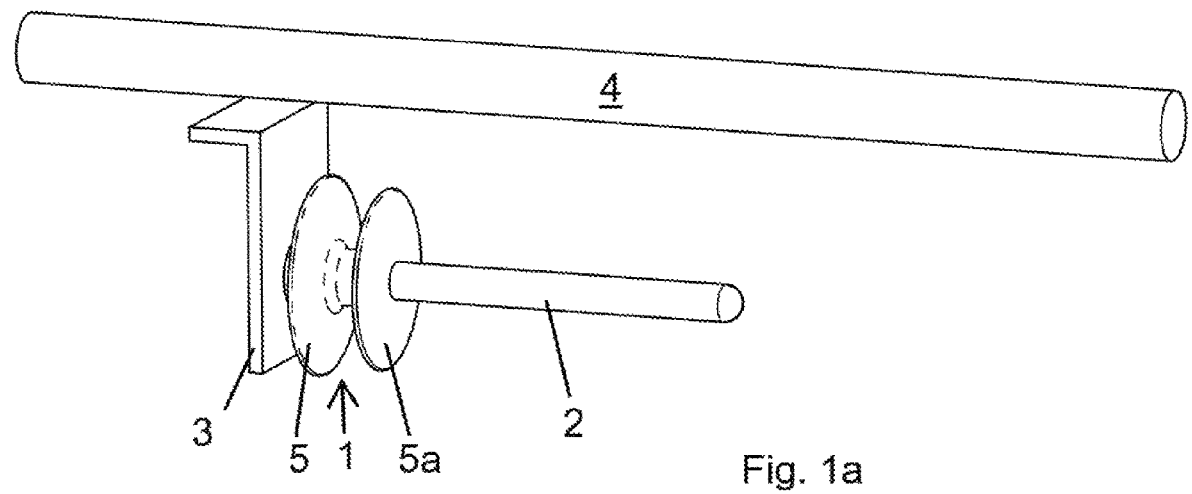

This application claims priority to, co-pending German Patent Application entitled "WATER REPELLENT FAIRLEAD SEAL," filed on Mar. 14, 2018, and assigned application number 10 2018 105 870.5, which is incorporated herein by reference in its entirety.

The invention relates to a fairlead seal, especially for leading a rod-shaped, elongated object through a housing wall, wherein the fairlead seal encloses the rod-shaped object with form fit in the area of the fairlead, and the fairlead seal has at least one radially protruding insulating rib encircling the object on its circumference and a hydrophobic surface.

TECHNICAL BACKGROUND

In the monitoring of overhead lines one uses measuring devices which are arranged in a housing attached to a conductor strand of an overhead line. The housing of such a measuring device may consist of an electrically insulating material (a dielectric). Such a measuring device may have a measuring probe, or sensor, which is installed in the device, or which is led out from the housing through an opening in the housing wall, the measuring probe being led out horizontally from the housing, for example. The housing may be suspended from a conductor strand of the overhead line, so that the housing is mechanically connected to the conductor strand, but electrically insulated from it. The measurement device can detect electrical signals or fields occurring in the surroundings of the overhead line strand by means of the measuring probe. In this way, such a measuring device can be placed almost anywhere in the neighborhood of a conductor strand.

If a continuous liquid film is formed from the conductor strand across a suspension and the housing of the measuring device up to the measuring probe, this may produce an electrically conductive connection between the conductor strand and the measuring probe, which impairs the function of the measuring device. Accordingly, measuring devices in which the measuring probe is situated only inside the device housing have the drawback of not furnishing any useful measured values once the housing is covered at least in part by a liquid film, since this has a screening effect, similar to a Faraday cage.

In order to prevent weather influences such as precipitation or moisture from producing such an electrical connection between the conductor strand via the housing to the measuring probe, the measuring device should be designed in such a way that any such continuous liquid film is interrupted in at least one place. In particular, it may be advantageous to interrupt such a conductive liquid film at the transition between the housing of the measuring device and the measuring probe, so that the measuring probe is situated in the field being measured, yet the measured value is not distorted by the measuring probe being conductively connected to the housing of the measuring device.

The problem is solved by the fairlead seal described below. The invention shall be described more closely below with the aid of figures.

Figure 1B:
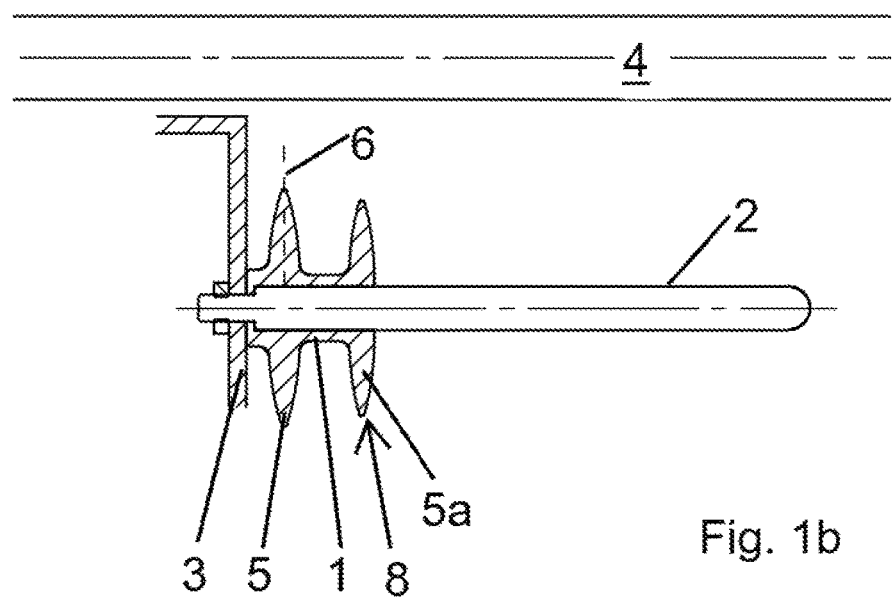
Figure 1C:
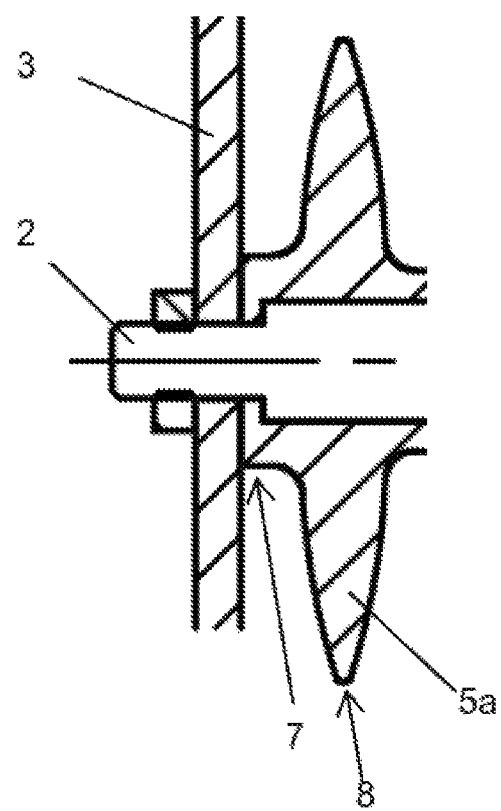
Figure 2A:
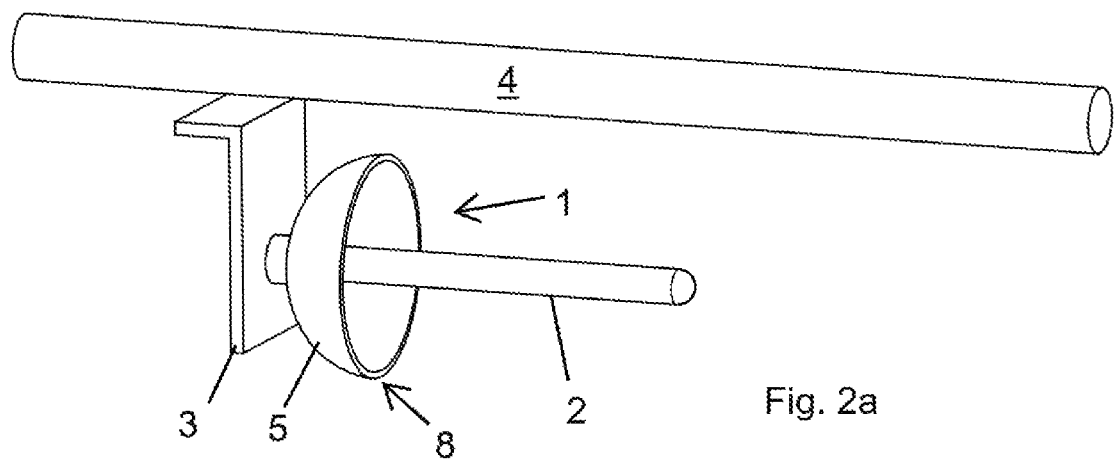
Figure 2B:
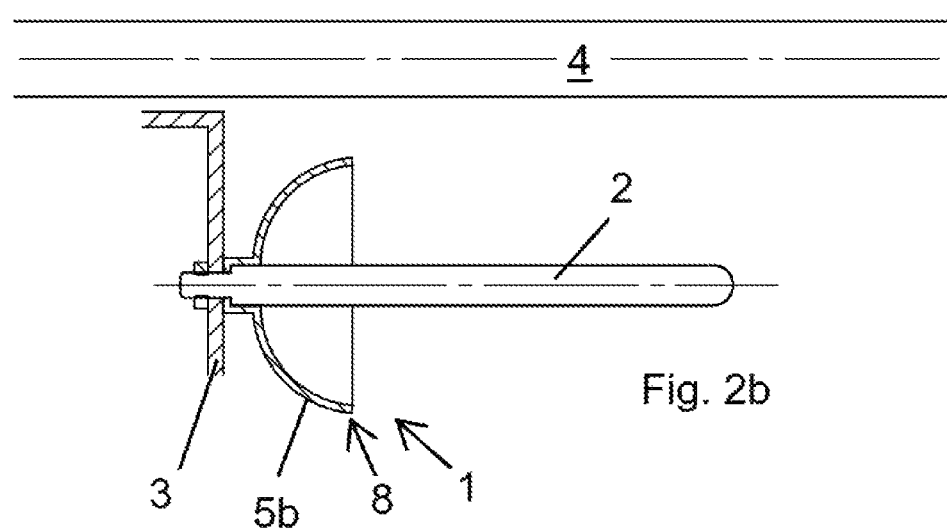

There are shown:

FIG. 1a: a perspective view of a first embodiment of a fairlead seal;

FIG. 1b: a sectional view of the first embodiment of the fairlead seal;

FIG. 1c: an enlarged cutout of FIG. 1b;

FIG. 2a: a perspective view of a second embodiment of a fairlead seal;

FIG. 2b: a sectional view of the second embodiment; and

Figure 3A:
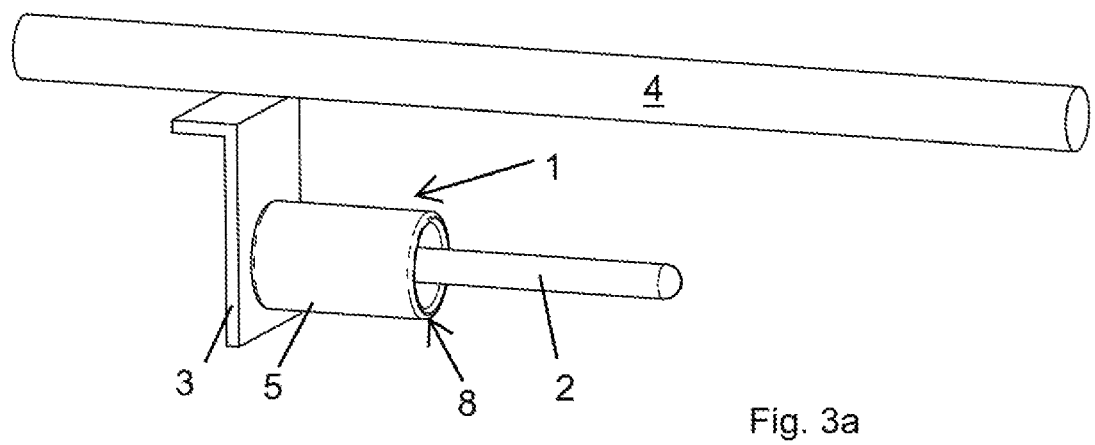
Figure 3B:
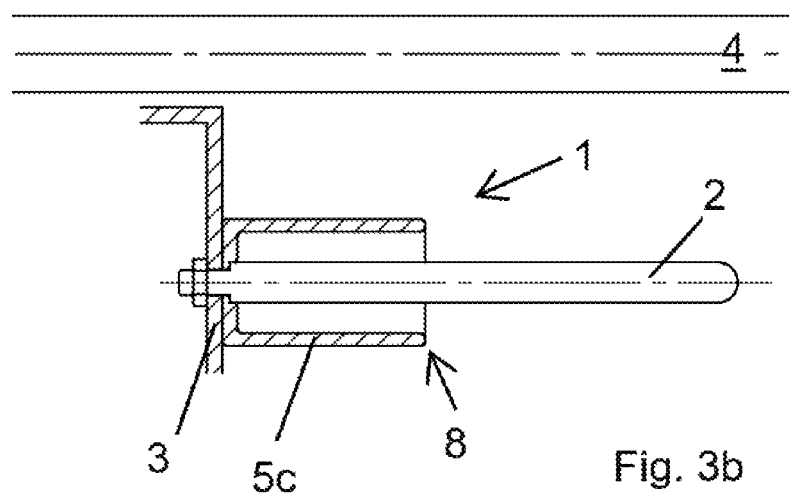

FIG. 3a: a perspective view of a third embodiment of a fairlead seal;

FIG. 3b: a sectional view of the third embodiment.

FIG. 1a shows a perspective view, FIG. 1b shows a sectional view of a fairlead seal 1, which encloses by form fit the measuring probe or a conductor or an elongated object 2 at least in a partial area of the object 2. Without limiting the general nature of the invention, the elongated and rod-shaped object 2 is termed the object 2 in the following. The object 2 is a first embodiment may consist of an electrically conductive metal similar to an antenna.

The fairlead seal 1 encloses the object 2 in one embodiment such that the fairlead seal touches the object 2 in one area and lies against the surface of the object 2 there. The fairlead seal encloses the object 2 with form fit, so that moisture cannot accumulate between the fairlead seal 1 and the object 2. The opening of the fairlead seal, through which the object 2 passes, can form a clamping seat for the object 2, so that the fairlead seal 1 lies against the surface of the object 2 in at least one section.

The object 2 is passed through an opening of a wall 3 of a housing, being shown here only in a cutout view, so that the object 2 is introduced into the interior of the housing and in any case into the housing wall 3. The housing wall 3, which is represented only schematically in the figures by a partial section, may be any given wall, being typically formed from an electrically nonconductive material. In the embodiment shown, the housing wall 3 surrounds the object such that the housing wall 3 lies against the surface of the object 2 with form fit.

In an alternative embodiment not represented in the figures, the fairlead seal 1 and the opening in the wall 3 are configured such that the fairlead seal 1 surrounds the object 2 and protrudes into the opening, so that the housing wall 3 lies against the fairlead seal 1 in one section thereof, the fairlead seal 1 surrounds the object 2 in the area of the housing wall opening and lies against its surface so that the fairlead seal is situated in the plane of the housing wall opening between the housing wall 3 and the object 2.

The fairlead seal 1 may preferably have a shoulder-shaped configuration 7 in the area of the fairlead through the housing wall 3, see FIG. 1c, so that the shoulder engages with a corresponding recess or constriction of the object 2. The shoulder-shaped configuration of the fairlead seal may be designed such that it is situated in the direction of the long axis of the object 2 between the object 2 and the housing wall 3 and engages tightly there. As shown in this and the further embodiments, the fairlead seal may have the shoulder-shaped configuration for any form of the insulating ribs 5.

The surface of the fairlead seal is configured such that this prevents the formation of a continuous liquid film between the housing wall 3 and the object 2. Especially if the housing is arranged on a conductor strand 4 or in the vicinity of a conductor strand 4 of a (high) voltage line, there is a danger of forming a continuous liquid film between the conductor strand and the object and thus a conductive connection between the conductor strand carrying (high) voltage and the object during precipitation. In this case, (high) voltage would exist on the object.

The surface of the fairlead seal is accordingly configured such that the path from the housing wall 3 through the fairlead seal 1 and to the measuring probe 2 is as long as possible and configured such that the formation of a liquid film is prevented. If precipitation occurs on the overall layout, this should drain off from the fairlead seal downward as fast as possible. This is accomplished by the geometrical configuration and the hydrophobic surface of the fairlead seal 1.

The fairlead seal 1 has at least one insulating rib 5 encircling the object 2 in the circumferential direction. The at least one insulating rib may be formed with rotational symmetry, in which case the long axis of the object 2 is the imaginary axis of rotation.

As shown in FIGS. 1a and 1b, the at least one insulating rib 5 can be configured as an ellipse which is substantially disk-like, yet symmetrical in cross section to an imaginary plane 6 perpendicular to the long axis of the object and tapering to a point. The point of the ellipse may have in particular an acute angle, especially an angle of less than 45 degrees. The pointed edge of such an insulating rib 5 thus forms a preferred drip edge for water droplets draining onto the fairlead seal.

Besides a first insulating rib 5, the fairlead seal may have at least one further insulating rib 5a, arranged with a displacement in the direction of the long axis of the object 2. The further insulating ribs may be configured likewise substantially symmetrical to a plane perpendicular to the long axis, however they may be configured larger or smaller in radial extension. As shown in FIGS. 1a and 1b, the insulating ribs in one embodiment may become smaller in their radial extension with increasing distance from the housing fairlead. In alternative embodiments, the insulating ribs 5 may be of uniform size or become larger with increasing distance from the housing fairlead.

The body of the seal 1 is made of an electrically nonconducting material. The material in one preferred embodiment may be a permanently elastic plastic such as silicone or PTFE (polytetrafluorethylene) or PE (polyethylene) or PP (polypropylene) or POM (polyoxymethylene).

In an alternative embodiment, the material of the seal body 1 may be a rigid material, such as a ceramic, which encloses the housing 3 and/or the object 2 with form fit. This may be the case in particular when the object 2 is (slightly) plastically deformable, for example, it has an elastic layer on its surface, making a form fit with the seal 1, and the housing wall 3 likewise has a surface producing a form fit and thus a liquid-tight connection to the fairlead seal.

Insofar as the material of the seal body does not already have a hydrophobic surface on account of its material properties, the seal has a hydrophobic or superhydrophobic coating. In one embodiment, a seal body may be coated with PTFE or PE or PP or POM or another microstructure or nanostructure with a corresponding (super)hydrophobic property. A hydrophobic or superhydrophobic coating has the effect that liquid rolls off of (super)hydrophobic surfaces and other substances cannot adhere to these surfaces. In this way, precipitation can drain down from the surface of the seal 1, so that the formation of a continuous conductive liquid film on the surface of the seal is prevented. In the event that solid particles have become deposited on the surface of the seal, these can be rinsed away, for example when rain or other precipitation rolls off from the surface and drains downward.

FIGS. 2a and 2b show an embodiment of a fairlead seal 1 in which the at least one insulating rib 5b is formed with radial symmetry about the longitudinal axis of the object 2 and in the form of a bell, so that the insulating rib 5 shades the object 2 in the arrangement shown. The fairlead seal here is arranged preferably in the horizontal direction, i.e., with horizontally situated axis of rotation, as depicted. Likewise, as in the embodiment described above, the insulating rib 5 may have a pointed tapering drip edge at its radial end 8.

FIGS. 3a and 3b show an embodiment of a fairlead seal 1 in which an insulating rib 5c is arranged in rotational symmetry around the object 2 and in the shape of an open-ended cylinder, wherein the closed end of the cylinder-shaped insulating rib 5c lies against the housing wall 3. The insulating rib 5c thus shades the object 2 along the length of the cylinder-shaped insulating rib 5c and encloses the object 2 in a U-shape. The cylinder-shaped insulating rib may have a drip edge at its radial end.

LIST OF REFERENCE NUMBERS

1 Fairlead seal
2 Rod-shaped object, measuring probe
3 Housing wall
4 Conductor strand
5, 5a Insulating rib
5b Bell-shaped insulating rib
5c Cylinder-shaped insulating rib
6 Plane perpendicular to the rod-shaped object 2
7 Shoulder-shaped configuration
8 Drip edge

The invention claimed is:

1. A system, comprising:
   an electrical conductor for power transmission;
   a measuring probe for detecting an electrical field surrounding the electrical conductor, the measuring probe passing through a wall, the measuring probe being rod-shaped and situated proximate to the electrical conductor; and
   a fairlead seal for sealing a fairlead of the measuring probe, wherein the fairlead seal surrounds the measuring probe with form fit in an area of the fairlead, and the fairlead seal has at least one radially protruding insulating rib encircling the measuring probe at a circumference of the measuring probe, and the fairlead seal has a hydrophobic surface at least in the area of the insulating rib such that the insulating rib sheds water falling from the electrical conductor away from an exposed surface of the measuring probe.

2. The system of claim 1, wherein the at least one insulating rib is disk shaped and has a cross sectional shape of an ellipse tapering to a point.

3. The system of claim 1, wherein the insulating rib is bell-shaped and the measuring probe is shielded from the water by the bell-shaped insulating rib.

4. The system of claim 1, wherein the at least one insulating rib radially encloses the measuring probe in a U-shape.

5. The system of claim 1, wherein the fairlead seal is formed from one of the materials: silicone, polytetrafluorethylene, polyethylene, polypropylene or polyoxymethylene.

6. The system of claim 1, wherein the fairlead seal has a hydrophobic surface coating at least in the area outside the fairlead.

7. The system of claim 1, wherein the fairlead seal is permanently elastic at least in the area of the fairlead through the wall.

8. The system of claim 1, wherein the fairlead seal has a shoulder-shaped configuration in the area of the fairlead through the wall.

9. The system of claim 1, wherein the at least one insulating rib is configured as a pointed drip edge at its radial end.

10. The system of claim 1, wherein the measuring probe is situated beneath the electrical conductor.

11. The system of claim 1, wherein the wall is a housing wall.

12. The system of claim 1, wherein the fairlead seal prevents a formation of a continuous liquid film between the electrical conductor and the measuring probe.

13. The system of claim 1, wherein the measuring probe consists of an electrically conductive metal.

14. The system of claim 1, wherein a non-electrically conductive surface of the wall lies against a surface of the measuring probe with form fit.

15. The system of claim 1, wherein the fairlead seal protrudes into an opening of the wall and surrounds the measuring probe in an area of the opening.

16. The system of claim 1, wherein the fairlead seal has a shoulder that engages with a constriction of the measuring probe.

\* \* \* \* \*